United States Patent [19]

Santurtûn et al.

[11] Patent Number: 4,589,051
[45] Date of Patent: May 13, 1986

[54] SECOND BREAKDOWN PROTECTION CIRCUIT FOR X-RAY GENERATOR INVERTER

[75] Inventors: Carlos M. Santurtûn; Felix L. Ceca; José M. Q. Benegoechea, all of Madrid, Spain

[73] Assignee: General Electric Company, Milwaukee, Wis.

[21] Appl. No.: 564,539

[22] Filed: Dec. 22, 1983

[51] Int. Cl.⁴ .............................................. H02H 3/20
[52] U.S. Cl. ....................................... 361/88; 361/100; 363/56
[58] Field of Search ................... 361/88, 90, 100, 101; 363/23, 25, 53, 55, 56, 58, 97, 133, 134, 131, 132

[56] References Cited

U.S. PATENT DOCUMENTS

| | | | |
|---|---|---|---|
| 3,567,940 | 3/1971 | Lambert | 250/102 |
| 3,855,520 | 12/1974 | Stich | 361/88 X |
| 4,065,802 | 12/1977 | Mizukawa et al. | 361/100 X |
| 4,221,968 | 9/1980 | Franke | 250/402 |
| 4,309,612 | 1/1982 | Aichinger | 250/409 |
| 4,317,039 | 2/1982 | Romandi | 250/418 |
| 4,322,625 | 3/1982 | Daniels et al. | 250/409 |
| 4,344,122 | 8/1982 | Jones | 363/23 |
| 4,348,590 | 9/1982 | Daniels et al. | 378/112 |
| 4,361,901 | 11/1982 | Daniels et al. | 378/106 |
| 4,371,824 | 2/1983 | Gritter | 363/56 X |
| 4,375,105 | 2/1983 | Baumann | 378/92 |
| 4,377,002 | 3/1983 | Krause et al. | 378/93 |

OTHER PUBLICATIONS

Walter Weigl, "A New High-Frequency Controlled X-Ray Generator System with Multi-Pulse Wave Shape", Jun. 1983, pp. 7–19 in *The Journal for Radiological Engineering*, vol. 1, No. 1, Jun. 1983.

*Primary Examiner*—A. D. Pellinen
*Assistant Examiner*—T. DeBoer
*Attorney, Agent, or Firm*—Duckworth, Allen, Dyer & Pettis

[57] ABSTRACT

In an X-ray generator operating with a pulse-width-modulated transistor inverter, circuitry is provided to sense the collector-emitter voltage of each of the transistors and to responsively turn off the transistor when that voltage level reaches a predetermined threshold level which is indicative of a problem. Provision is included to inhibit the operation of the protective circuit during the time period in which the transistor is turning on so as to thereby allow for higher voltages during that critical period.

2 Claims, 7 Drawing Figures

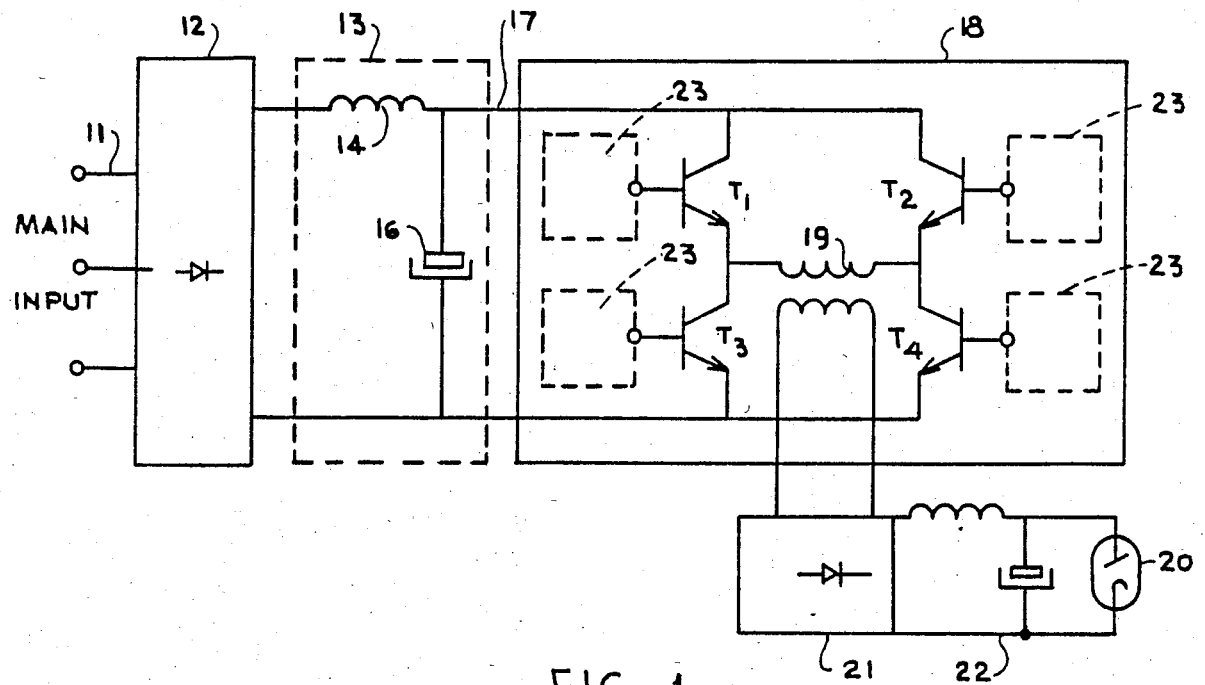
FIG. 1
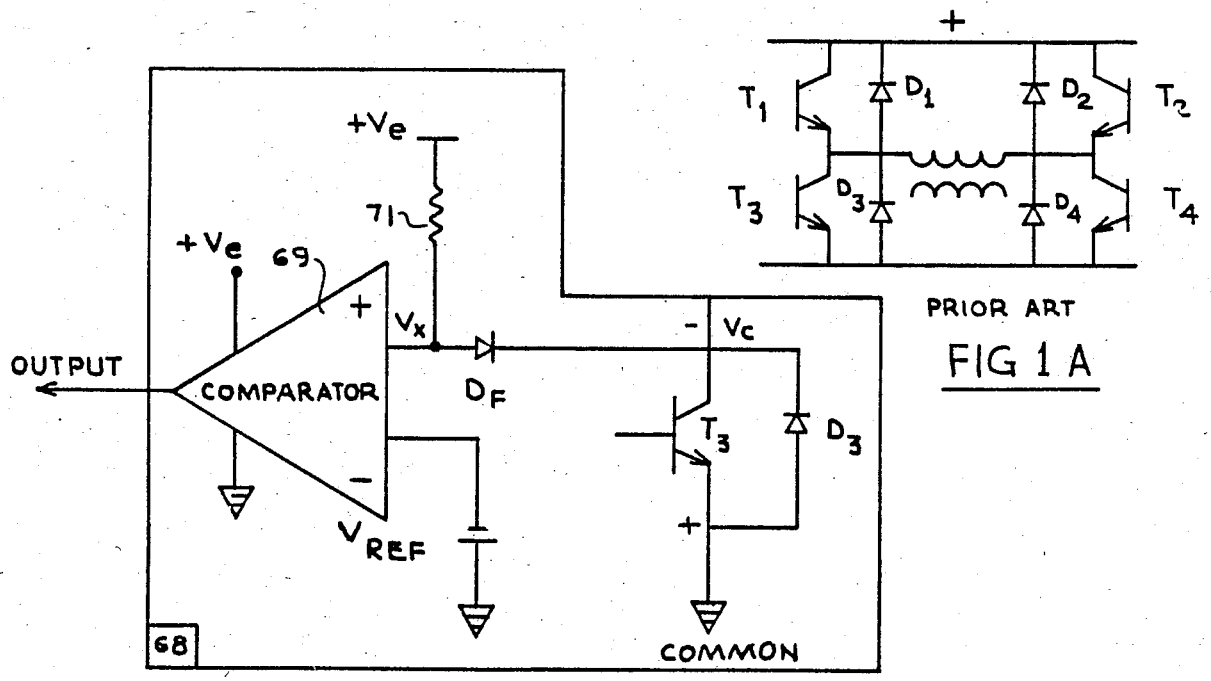
PRIOR ART
FIG 1A
$V_X = V_C + V_{DF} \approx V_C + 0.7 V$
$V_{X(MAX)} = +V_e$
$V_{REF} \approx +1 V$
FIG. 4

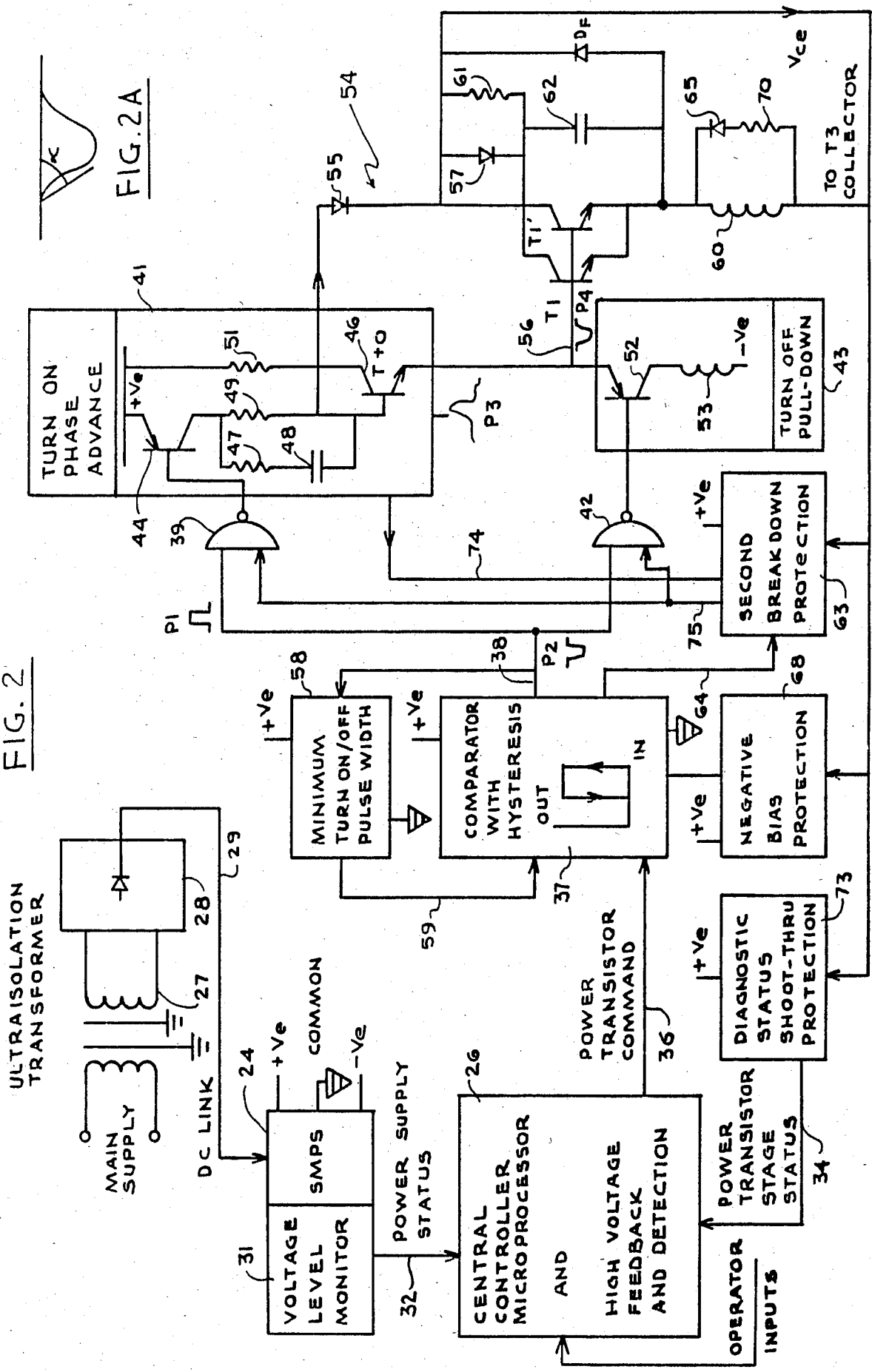

TRANSISTOR T1 "ON": $V_x = V_c + D_F = V_c + 0.7$
TRANSISTOR T1 "OFF": $V_x = V_e$

SECOND BREAKDOWN PROTECTION CIRCUIT FOR X-RAY GENERATOR INVERTER

CROSS REFERENCE TO RELATED APPLICATIONS

This Application is related to the following commonly assigned, concurrently (Dec. 22, 1983) filed U.S. applications: Ser. No. 564,612, entitled "Inverter Driver for X-Ray Generator"; Ser. No. 564,581, entitled "Inverter Variable Deadtime for X-Ray Generator"; and Ser. No. 564,549, entitled "Shoot-Thru Protection for X-Ray Generator Inverter" now abandoned.

BACKGROUND OF THE INVENTION

This invention relates generally to X-ray generators and, more particularly, to protective circuit means for a transistor inverter applied to an X-ray generator system.

The use of an inverter in an X-ray generator circuit to provide an alternating current to the primary high voltage transformer is known. However, due primarily to the fact that they are relatively difficult to control, transistor have generally not been used for this purpose. Rather, it has been the thyristor which has been used for the switching device in these applications. Although thyristors are considered to be generally rugged and relatively easy to control, they have the inherent disadvantage of requiring the use of forced commutating circuitry. Thus, not only is there a need for extra components, but also, the added circuitry tends to limit the maximum system operating frequency and to also substantially increase the circuitry losses.

The use of transistors as a switching device in an inverter is commonly made in many applications. One such application is in the transportation field where there is a requirement for controlling high power at medium voltage levels. However, in the X-ray generator field, where there is a requirement for not only high voltages involved but also a desire to operate at higher frequencies to minimize the ripple on the output waveform, the use of transistors as switching devices in inverters has not been made. One of the reasons is that a transistor is generally less rugged than other switching devices, such as the thyristor. Another reason for not using transistors in such an application is that, until recently, there have been few, if any, transistors which are more capable of reliably operating at the required voltage and current levels (e.g., 600 volts, 300 amps.). Finally, it is generally understood that the use of transistors presents unique and difficult control problems that do not exist for other switching devices.

In conventional X-ray generator systems, the power level to the X-ray tube is varied by way of a variable input/output transformer whose primary windings are selectively closed by way of static contactors, such as, for example, thyristors. Such systems have various disadvantages as discussed in U.S. patent application Ser. No. 564,538, filed concurrently herewith and incorporated herein by way of reference. Although the concept of using pulse-width modulation to control the output of a transistor inverter has been used for certain applications, it has not heretofore been used in the X-ray generator field. This is partly due to the inherent disadvantages of transistors as discussed hereinabove. In addition, there are other specific problems which arise when a transistor inverter is applied to an X-ray generator.

In X-ray generators, it is desirable that the relatively high output voltage be controlled very accurately and have minimum ripple. Further, the system should have a fast response on the rise time to guarantee reproducible, short exposure times. It is recognized that these characteristics can be enhanced by operating at higher frequencies. However, such high-frequency operation is limited by the performance capabilities of the available components. For example, in a transistor inverter, one of the problems is that of minimizing the dead times on the transistor switching which in turn depend on the operating characteristics of the transistor itself, i.e., the associated storage and fall times thereof. Commercially available transistors handling currents of 500 amps., with collector-emitter open voltage capability of 1000 volts have storage and fall times which vary and are in the range of 6–35 microseconds (typically 20 microseconds), depending on the manufacturer.

In order to minimize the output filter (improve the response) and the size of the high-tension transformer, it is desirable to operate at a relatively high frequency, i.e., in the range of 5–15 kHz. At these higher frequencies, a long or normal transistor storage time can seriously affect the control problem. For example, at 10 kHz, a total inverter period is only 100 microseconds and half a period is 50 microseconds. Accordingly, an uncontrolled storage time in the range of the typical 20 microseconds is very significant and will cause very serious distortion of the output voltage waveform.

Another limitation of transistors used in an inverter is the inherent sensitivity to excessive current. Since it is generally desirable to control the current flow in an inverter which has a critical current limitation, most inverter systems are provided with some kind of current limit protection. However, it is recognized that such protection networks have certain limitations. For example, the time required for a current limit circuit to complete its operation may be excessive so as to allow a second breakdown in the output transistors. This is so because, first of all, it is necessary to detect the excessive current on the output circuit. Secondly, it is usually necessary, for noise minimization purposes, to integrate the signal. And finally, it has to be compared with a reference value and, if it exceeds the threshold, it then has to be applied to cause the transistor controller to shut down the system.

Another problem which arises with square-wave inverters is one which is of particular concern with pulse-width-modulated systems. When a pulse-width-modulated transistor turns off, its series-connected transistor becomes reverse biased during the time period when its associated flywheel diode is conducting. If the pulse-width-modulated transistor is turned on during that period, then a large current spike can occur to cause damage to the devices.

A more serious result can occur from a phenomenon known as shoot-thru in an inverter. Such a condition is a short circuit across a pair of series-connected transistors in an inverter. This will occur if both of the series-connected transistors are turned on at the same time, which may occur in the event of a controls failure or because of noise that may be introduced to the system.

In order to provide a reliable output, an inverter system must accommodate the inherent variations that occur in the source and in the load. Moreover, there are also certain, occasional, unplanned conditions, such as an arc in the tube, which may occur on the high-voltage side which, if not controlled, may damage the inverter or the other components. Further, in any control network, there is a possibility of malfunction failure in the low-voltage control circuitry which, if not detected and attended to, may cause undesirable consequences within the control network itself or at the output of the system. Thus, with any control or performance-enhancing features that may be added to a conventional system, there are related monitoring and regulating features which must be provided to accommodate those enhancements.

OBJECTS OF THE PRESENT INVENTION

It is therefore an object of the present invention to provide an X-ray generator system with an improved inverter and associated driver system.

Another object of the present invention is a provision in an X-ray generator inverter for reliably controlling the operation of the included switching devices to obtain improved output performance of the system without significant risk of damage to the components thereof.

Another object of the present invention is the provision of an X-ray generator inverter system for limiting the current flow in the inverter to a safe level by sensing the related conditions and quickly and reliably responding to undesirable conditions.

These objects and other features and advantages will become more readily apparent upon reference to the following description when taken in conjunction with the appended drawings.

SUMMARY OF THE INVENTION

Briefly, in accordance with one aspect of the invention, a square-wave inverter employs a plurality of transistors arranged in a full-bridge network to alternately conduct current through the coil of a high-voltage transformer by way of its diagonals. The power output level is controlled by pulse-width modulation of a portion of the transistors. An inverter controller acts to drive the inverter in response to signals indicative of desired outputs. As part of the transistor driver mechanism, there are provided positive and negative voltage sources which are selectively applied by way of logic control signals to respectively turn on and turn off the transistors of the inverter. A phase-advance network is included in the turn-on circuitry to ensure a quick turning on of the transistors. An adequate pull-down circuit with optimized characteristics is provided to quickly turn off the transistors so as to minimize the storage and fall times thereof.

In order to accommodate the variable load conditions, provision is made to selectively divert the base current not needed from the transistor in the turn-on circuit to the collector of the output transistor. In this way, the output transistors have sufficient drive to handle an overload condition, while at the same time being able to adapt to a small storage time condition during periods of very light loads.

For protection against excessive current in the inverter, there is a safety network provided which senses the voltage level on the collector of each of the output transistors, and, if that voltage level exceeds a predetermined threshold level, the turn-off mechanism is activated and the turn-on mechanism is inhibited before the device reaches the second breakdown limit.

Another protective circuit is included to avoid the situation where a non-pulse-width modulated transistor could be turned on when its corresponding flywheel diode is still conducting to thereby cause the transition from reverse conduction to direct conduction in an uncontrolled manner, which, in turn, could lead to transistor damage from a second breakdown condition. A network is provided to sense when the associated flywheel diode is conducting and for preventing the turning on of the non-pulse-width-modulated transistor during that period.

Yet another protective circuit is provided to avoid a shoot-thru condition in the inverter. The voltage level on the collector of one transistor is sensed and a representative optical signal is generated to provide an indication to the control system when that transistor is turned on. Provision is then made to inhibit the series-connected transistor from turning on during that period.

In the drawings as hereinafter described, a preferred emobodiment is depicted; however, various other modifications can be made thereto without departing from the true scope and spirit of the invention.

BRIEF DESCRIPTION OF THE DRAWINGS

FIG. 1 is a block diagram of the preferred embodiment of the invention;

FIG. 1a is a schematic illustration of an inverter arrangement as known in the art;

FIGS. 2 and 2a show schematic illustration of the driver system in accordance with the preferred embodiment of the invention;

FIG. 4 is a schematic illustration of the negative bias inverter bridge protection portion of the present invention.

DESCRIPTION OF THE PREFERRED EMBODIMENT

Figure 5:
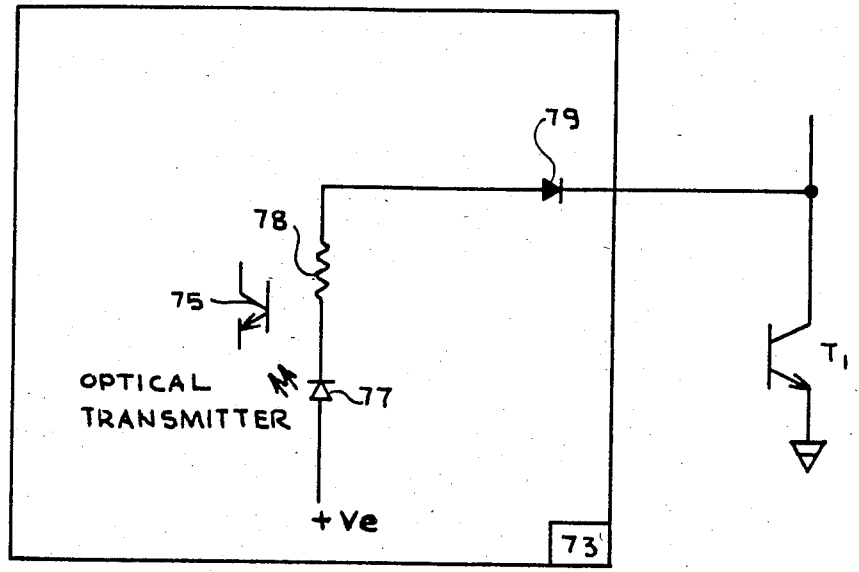
FIG. 5 is a schematic illustration of the shoot-thru protection portion of the present invention.

The pulse-width-modulated (PWM) inverter system, with which the present invention is used, is shown in FIG. 1 to include: an a.c. power supply 11, which may be a three-phase power supply, as shown, or, alternatively, a single- or two-phase supply; a rectifier 12; and a filter 13 comprised of an inductance 14 and a capacitance 16, all of which are conventional in the art. The a.c. main input is rectified and filtered to provide on line 17 a smooth, fixed d.c. rail which in turn is applied to a transistor inverter 18. The inverter 18, which comprises transistors $T_1$ through $T_4$ and high-voltage transformer 19, is operated in a PWM mode to selectively provide the desired high-voltage output value which is rectified by rectifier 21 on the high-voltage side and smoothed with filter 22 to achieve the variable dc output required for application to the X-ray tube 20.

The power transistor inverter 18 is controlled by a control microprocessor controller shown in FIG. 2, which directly controls and commands the operation of the power transistors $T_1$–$T_4$ of the single-phase bridge inverter 18 by four identical drivers, shown generally at 23 in FIG. 1. The microprocessor controller itself includes a 300 watt switch mode power supply 24, electronic drivers and protective circuits to switch on and off, and to operate and protect, the power transistors $T_1$–$T_4$, and an input-output optically isolated system to interface in a modular way with a central microprocessor 26, which in turn controls the overall system including the power transistor inverter 18.

The switch mode power supply (SMPS) 234 is fed by the main supply through an ultra-isolation transformer 27, which offers a high attenuation in common and transverse modes to disturbances coming from the main supply and to the SMPS 24, itself. The output of the ultra-isolation transformer 27 is rectified by rectifier 28 to produce a dc link 29 which is the main power input to the switch mode power supply 24, which is modulated in a closed loop voltage feedback operation to produce the two rails +Ve and −Ve as shown. The +Ve rail is a stabilized dc rail which delivers the necessary power to turn on the power transistors, whereas the −Ve rail is a non-stabilized dc rail to produce the necessary pull-down current to turn off the transistors in a few microseconds. As part of the switch mode power supply 24, there is a voltage level monitor 31 which ensures the proper voltage levels on both +Ve and −Ve rails so that, should the switch mode power supply 24 fail, then voltage level monitor 31 will immediately send, by way of an optically isolated fibre-optics line 32, a command status signal to the central controller microprocessor 26 to shut down the system.

Also shown as part of the central microprocessor block 26 is a high-voltage feedback and detection circuit, which works with the central microprocessor but is actually a separate network which is more fully described in U.S. patent application Ser. No. 564,538, filed concurrently herewith and incorporated herein by reference. The communication to and from the central microprocessor 26 is done by means of optically isolated fibre optics, i.e., lines 34 and 36, respectively, to ensure higher noise immunity and avoid ringing on the edge of the generated train of pulses.

It should be mentioned that the required power level on the switch mode power supply 24 is about 300 watts to ensure that the transistor driver controller works in a universal fashion to allow control of 1, 2, or 3 power transistors in parallel with sufficient forward driving and pull-down capability to operate properly. With such an arrangement, the transistor controller can typically drive power transistor stages up to 1,000 amps or 1500 amps by using various parallel combinations, depending on the amount of power required by the transistor inverter 18. A switch-mode power supply was chosen to provide the required 300 watts to drive the larger power output stages, since the use of a linear voltage regulator could lead to a very complicated design for such an amount of power. Further, the combination of the power supply 24 and the transistor controller has been designed with several favorable features, including a large overload capability and a recovery period of about 400 microseconds to ensure that the inverter output stage can be turned on and off very quickly. The switch mode power supply and controller have been designed to be short-circuit proof, wherein any component failure resulting in power loss is immediately detected and communicated through the fibre optics to avoid a potential disaster on the output stage. The power supply is designed for a high switching frequency, i.e., in the range of 50 KHz, to improve the output response. The transistor controller is designed in a modulator and functional configuration to ensure the proper operation of the output stage at high freqencies to control a high level of power in the transistor inverter.

Referring now to the other individual components of FIG. 2, there is shown at 37 a comparator with hysteresis which is controlled, through fibre optics 36, from the main controller microprocessor 26 to ensure full isolation and high-noise immunity on the high-frequency command signals which control the X-ray exposures. The comparator 37 provides an output on line 38 which produces two kinds of pulses. The P1 pulses, as shown, will drive the output stage forward through NAND gate 39 and the turn-on circuit 41, whereas the pulses P2 will turn off 41 and, through the NAND gate 42, turn on the pull-down circuit 43.

The turn-on circuit 41 comprises a pre-driver transistor 44 and a driver transistor 46 which operate in combination to drive the parallel output transistors $T_1$ and $t_1'$, or other parallel combination which might be used. To quickly turn on transistors $T_1$ and $T_1'$ the predriver transistor 44 is turned on through gate 39 and, because of the phase advance relationship set up by the resistor 47 and capacitor 48, a large turn-on pulse P3 is produced to ensure that $T_1$ and $T_1'$ are turned on properly to control the flow of relatively large currents at high voltage levels, i.e., up to 1250 mA and 150 kVp. The phase-advance feature is critical when considering that an X-ray machine has a load which is a capacitor filter that is reflected back to the primary of the inverter 18. Since the output voltage on the high-tension transformer is as high as 150,000 volts, that output filter capacitor impedance is reflected back to the primary as $C \times N^2$, where C is the filter capacitance and N is the transformer turns ratio. The output transistor inverter therefore sees the load as a very high capacitive load since a large transient current will occur during the turn-on rise time and especially when an overload or arcing in the X-ray tube occurs. Hence, it is necesary to have the capability of pumping a high drive current into the output transistor, and this is done with the turn-on circuit 41, as explained above, through resistor 47 and capacitor 48 until capacitor 48 is charged and then resistor 49 takes over for normal operation.

The driver transistor 46 is base driven by transistor 44 and draws the necessary current through resistor 51 to protect against both the capacitive current overload effect and an arcing fault in the X-ray tube, where the output transistors would have to handle a very large current to ensure a correct operation.

The transistor controller of the present invention minimizes the pull-down time automatically through a pull-down transistor 52 and inductor 53 connected to the −Ve power supply, so that when transistor 52 turns on during the turning off period, the current flows from the emitter to the base, in the opposite direction than the forward current of the transistor $T_1$, from the common to −Ve. It will be recognized that the mininum time that it takes to turn off the output transistor $T_1$ depends primarily on the gain of that transistor and on the amount of current which that transistor is driving before it is switched off. Another determining factor is the voltage between the collector and the emitter of that transistor $T_1$, which is controlled by the antisaturation protection circuit 54.

The current from the common to the negative rail −Ve therefore controlled in two ways: (1) by the inductor 53; and (2) by controlling the collector emitter voltage on the pull-down transistor 52 through the base, to a level which will properly limit the maximum current flow on transistor $T_1$ to a safe level consistent with the system design. Hence, pulse P4 on line 56 (see FIGS. 2 and 2a) is width controlled and the amplitude is determined through the LC resonant pulse on the negative rail, which also defines the de/dt angle $\alpha$ when the negative pulse starts to flow. The slope $\alpha$, the maximum P4 pulse width, and the peak value of the negative pull-down current in the output transistors have to be optimized with the device geometry. For example, if the slope α is very steep, the collector-base junction will perform as a diode, hence, leading to a long time before the transistor $T_1$ recovers and is automatically turned off. Accordingly, the operation of the gate 42 controlling transistor 52 through the pulses $P_2$, bringing into circuit the inductor 53, will cooperatively optimize the pull down interval to a maximum value of less than 10 microseconds, to minimize the storage and fall times of the output transistor.

The antisaturation protection circuit 54 comprises a well-known Baker clamp diode 55 arranged in such a manner as shown so as to divert the base current not needed from transistor 46, to the collector of the output transistor $T_1$. So, when the load varies widely as happens in an X-ray generator, and the required base drive current in $T_1$ is small or less than the maximum required, then the excess of the base current flows through diode 55, and the base current condition produces a minimization in the storage time by increasing the collector-emitter voltage on the output transistor. In this way, we are assured (1) against overloads, (i.e., during the rise time when the transistor $T_1$ has to pump a lot of current into the load, diode 55 action will be minimized or negligible and the output transistor will have sufficient drive to handle such an overload situation); and (2) that when the load is very light (e.g., in X-ray fluoro operation) the needed current on the base of $T_1$ will be minimal or of a small value, and most of that will be diverted off through diode 55, thereby leading to a small storage time, which in turn results in better voltage control on the output stage through the high voltage feedback operation.

There are several combined features which ensure a maximum reliability during the pulse-width modulation operation which is, in effect, high frequency operation. The minimum turn-off and turn-on pulse-width circuit 58 receives an output from the comparator with hysteresis 37 and feeds back to it on line 59, a control signal which, notwithstanding the output of the comparator 37, operates to provide that: (1) during the turn-off period, there is a minimum pulse width which is greater than the minimum expected to ensure that in all circumstances the transistor $T_1$ peripheral circuitry, included for safety turn-on, has recovered completely, i.e., inductor 60 has been discharged through diode 65 and resistance 70, as di/dt protection at turn-on, and is ready for the next turning on; and (2) there is a minimum turn-on pulse to ensure that within the R-C snubber circuit around $T_1$ collector-emitter and consisting of resistor 61, diode 57, and snubber capacitor 62, the capacitor 62 has been completely discharged through resistor 61 and onto the collector of $T_1$, when $T_1$ is turned off. So therefore, the minimum turn-on pulse width from the circuit 58 is equal to or greater than the time constant defined by the RC snubber circuit. In this way, when transistor $T_1$ is commanded to switch off again, capacitor 62 has been completely discharged and the current flowing onto the collector of $T_1$ will be diverted off through the snubber mechanism and through diode 57 to very quickly charge capacitor 62 and, hence, improve the circuit breakdown and safe area of operation of the output transistor $T_1$.

Another important protection built into the transistor controller is that referred to as $V_{ce}$ (collector-emitter voltage) second breakdown protection 63. One of the functions of the present invention is to detect the instantaneous energy which is being dissipated on the junction of the transistor, which energy is obviously proportional to the collector-emitter voltage multiplied by the collector current and by the necessary time to turn off the device. A minimization of this dissipated energy is therefore achieved by having a very fast pull down, as explained above, and, also, by limiting the collector-emitter voltage by detecting the voltage on the collector of the transistor $T_1$ and feeding it into the protection circuit 63. If an overload occurs, and the current limit operation is not fast enough, what will happen, particularly in a large capacitive current type of load such as in an X-ray machine or on X-ray tube in a flash condition is that the $V_{ce}$ voltage is monitored by the protection circuit 63, and should it exceed a predetermined safe value, on the order of a few volts, then the output from the protection circuit 63 will feed both gates 39 and 42 to stop the forward driving on the transistors and instantaneously switch on the pull-down transistor 52 in order to turn off the device as fast as possible. Thus, the control circuitry for the transistor $T_1$ is designed so that, during the conduction time, the maximum voltage increase between the collector and the emitter will not damage the device and will allow for the proper turn off of the output transistor. The input signals which control the protection circuit 63 include an inhibit signal from the comparator 37 along line 64, and the Vce signal from the collector-emitter voltage detector. Its output is transmitted along line 75 for application to both NAND gates 39 and 42 to respectively stop the forward bias conduction and switch on the pull-down, turn-off mechanism.

Figure 3:
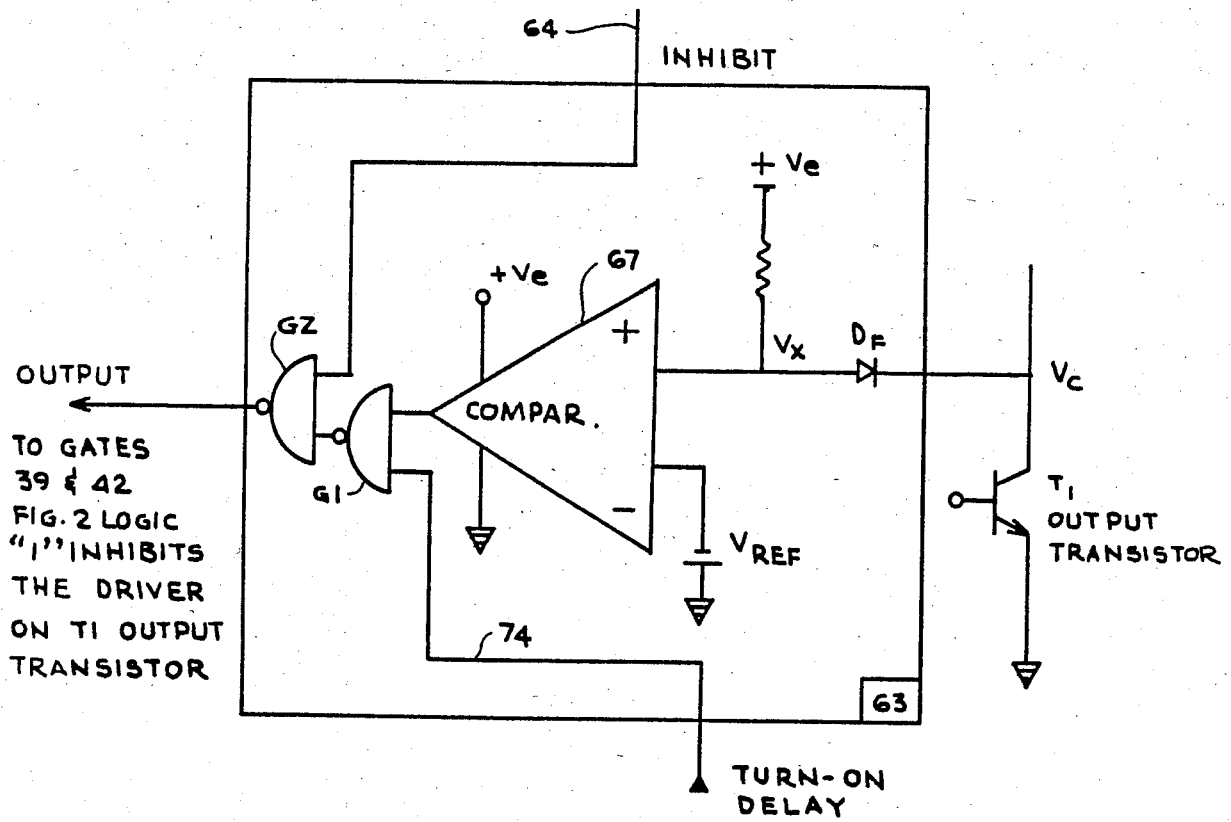
FIG. 3 is a schematic illustration of the second breakdown protection portion of the present invention.

Referring now to FIG. 3, there are shown in greater detail the elements of the second breakdown protection module 63 of FIG. 2. As mentioned above, its function is to protect against high dissipation on the output transistor $T_1$ so that whenever the voltage on the collector of $T_1$ increases because the current is rising and the transistor is starting to get out of saturation, this collector voltage is monitored on the comparator 67 input at Vx, through diode $D_F$, and compared with a reference voltage $V_{REF}$ to turn on the comparator output which can go positive or negative depending on the status of the collector voltage. For example, if the collector voltage increases rapidly, the positive input will be greater than the reference voltage and the comparator 67 output will flip to a positive value, and that positive value will act on NAND gate G1 to provide a zero level to NAND gate G2, which in turn will provide a positive output to shut off the output transistor $T_1$. In addition to the input from the comparator 67, there is another signal that is applied to the gate G1. On line 74, there is provided the turn-on delay signal, which inhibits the operation of the second breakdown protection module 63 during the period when $T_1$ is turning on.

The other signal that is applied to gate G2 is the inhibit command signal which is effective during the turning off period. Under normal conditions when the transistor is on, neither the turn on delay signal nor the inhibit signal are operating and the output is controlled by the collector voltage Vc. If this voltage increases to a dangerous value, the comparator will go to a positive output, which in turn will produce a positive output on the overall module to stop the output transistor conduction. During the turning on period, however, the collector on the output transistor has to go from the inverter d.c. rail high voltage, say, 600 v., down to the saturation level, say 3 v., making a transition interval where $T_1$ has to be driven very hardly to minimize the losses during the turn on. During the turning off period the inhibit signal guarantees no retriggering due to the occurrence of spurious noise. In this way the two inputs, turn-on delay and inhibit signals, will take over so that the turn on delay will operate during the turning on and the inhibit signal will operate during the turning off.

It is appropriate to mention here the relationship between the Vce second breakdown protection circuit 63 which detects the $V_{ce}$ collector voltage and monitors it to guarantee that it is at the appropriate level to avoid the transistor coming in to the second breakdown area, and the turn-on phase advance module 41, which applies the turn-on pulse during the switching on of the output transistor. During the interval that the voltage between the collector and emitter is dropping from, say, the fixed d.c. rail on the inverter down to the antisaturation circuit level which is, for example, 3 volts, the second breakdown protection module 63 is inhibited by the turn-on phase advance circuit 41 which, during a short time, will pulse on the output transistor $T_1$ very hard until it is sure that the transistor $T_1$ gets into saturation. After a few microseconds, the second breakdown protection module 63 will then be effective to control that condition. Hence, the turning on delay line 74 from module 41 to module 63 will inhibit the action of the second breakdown protection module 63 during the turning on of the output transistor until the collector-emitter junction reaches a low level, which means that the transistor is operating near the saturation conditions and is thus far away from the second breakdown area.

Another protection built into the transistor controller is shown generally at 68 in FIG. 2 and is referred to as dv/dt negative bias inverter bridge protection. Normally, square-wave inverters with no modulation are relatively easy to control. However, a problem arises with pulse-width modulation inverters when on transistor is switched on and the series connected bottom transistor in the same leg of the bridge is subjected to a high dv/dt effect. This can be seen by reference to the inverter bridge circuit of FIG. 1a. The above situation occurs mainly in inductive loads where the one transistor, for example, the top transistor $T_1$ in an inverter bridge, is turned off, and the bottom diode $D_3$ takes over the load current. In such cases, the bottom transistor $T_3$ associated with the particular flywheel diode $D_3$ is now in reverse bias conduction, where the emitter is converted into the collector and the collector is converted into the emitter, so that the distribution of the currents within the junction of the transistor will produce a large current spike when the top transistor is turned on in pulse-width modulation fashion. This is due to the charges that are stored at the collector base region of the bottom transistor $T_3$ because of the capacitance on the collector base junction. When the stored energy is fed back onto the base emitter, the transistor is suddenly turned on with a very large current. Thus, in this way, the reverse bias on the bottom transistor can produce a large spike of current circulating from the top to the bottom, which can damage the devices.

By pulling down the base of $T_3$ during the turn-off phase, the situation is improved in that most of the collector-to-base current is fed back down to the negative line power supply. This is done by providing a negative bias on the base of $T_3$. But this protects only against conduction of $T_3$ and not against conduction of diode $D_3$ during reverse recovery, where the amount of reverse current throughout $D_3$ is being reduced by the use of saturable reactors or standard inductances in series with every transistor of the bridge. It is therefore the purpose of circuit 68 to prevent the turning on of transistor $T_3$ during the periods that diode $D_3$ is conduction.

The output of an X-ray generator machine varies as a function of the pulse-width modulation duty cycle, or mark/space ratio, and as a function of the specific technique or parameters which are applied, e.g., from 50 to 150 kilovolts in one kilovolt steps, and from 0.1 mA to 1250 mA. Thus, the output load is a variable power factor system, and we might find situations when diode $D_3$ is conducting at the turn-off of the top transistor for a short or a medium length of time or, alternatively, is not conducting if the load looks very resistive, from the power factor point of view, when the negative bias dv/dt top/down inverter bridge protection is not operating. The required inverter dead time cannot readily be calculated over the necessary dynamic operating range. Hence, we have chosen to use the circuitry of FIG. 4 to provide for a variable dead time, with automated compensation, dependent on the load time constant (L/R).

FIG. 4 shows a schematic of the reverse conduction inverter bridge protection circuit 68. When the output transistor $T_3$ is bypassed by the flywheel diode $D_3$ because the load is inductive, and during the modulation off period of the top transistor $T_1$, for example, the bottom diode $D_3$ takes over. The collector of transistor $T_3$ is then at a potential Vc, equal to the low voltage on the flywheel diode $D_3$ but at a negative value (reverse biased). This voltage Vc is detected on the positive comparator input which is held at Vx, so that Vx is the required voltage produced by the common voltage minus $VD_3$ plus $VD_F$, leading to an approximate summed value of zero volts. This voltage of $V_x$ input is compared with $V_{REF}$ of the comparator 69 to provide the output to the comparator with hysteresis 37 which in turn provides the output to the forward bias circuit on transistor $T_1$, as shown in FIG. 2.

The other two conditions which might appear when transistor $T_1$ is cut off are: (1) the collector voltage of $T_3$ may rise to a high level, such that diode $D_F$ stops current flowing from the power circuit back to the comparator. The Vx will now be at the potential of resistor 71 is determined by the positive power supply $+V_e$ acting through resistor 71, and (2) when transistor $T_3$ is switched-on forward after diode $D_3$ has stopped conduction, then the potential Vx will be equal to the collector-emitter voltage of $T_3+D_F$, which is greater than zero volts. So it is these three discrimination levels which are detected by the circuit as follows:

| 1. | $T_3$ OFF | $V_c \approx -0.7$ V. | $V_x = -0.7 + 0.7 = 0$ V. |
|---|---|---|---|
| | $D_3$ ON | | |
| | Comparator Output = 0 | | $T_3$ INHIBITED |
| 2. | $T_3$ ON | $V_c \approx V_{ce\ sat} \approx +2.5$ V. | |
| | $D_3$ OFF | $V_x = +2.5$ V. $+0.7$ V.$\approx 3.2$ V. | |
| | Comparator Output = 1 | | $T_3$ ENABLE |
| 3. | $T_3$ OFF | $V_c > +V_e$ | $V_x = +V_e$ |
| | $D_3$ OFF | | |
| | Comparator output = 1 | | $T_3$ ENABLE |

As part of the protection circuitry which is responsive to the Vce, there is shown at 73 of FIG. 2 a diagnostic status shoot-thru protection circuit whose function is to provide shoot-thru protection from the top transistor to the series connected bottom transistor when there is a failure of the turn-off mechanism or related device. Again, the collector-emitter voltage is fed back from the output transistor $T_1$ into the circuit 73, which continuously communicates to the main controller microprocessor, by way of optionally isolated fibre optics, the status of the power transistor system, as evidenced by the $V_{ce}$ value. Thus, by way of lines 34 and 36 the operation of the transistor driver circuitry and of the output transistors themselves are monitored in closed-loop operation so that any component failure in the output transistor or in the controller itself is automatically detected and communicated to the main microprocessor 26 which will initiate action to avoid a potential fault which would occur if the top and bottom transistors are switched on simultaneously, or if one transistor is directed to switch on when the other series-connected transistor is still on because of a failure in the controller.

For descriptive purposes, let us assume that the bottom transistor has been directed to switch off but that one of the components in the controller fails and allows that bottom transistor to remain on. Then a signal from the collector-emitter voltage will show that it is still conducting, so that the main controller microprocessor will recognize that the transistor is still on and will avoid the switching on of the top transistor by way of the transistor control. The reason for using fibre optics is because the switching on and off of the transistors leads to highly transient situations where the dv/dt can be as high as 5,000 volts per microsecond, and the di/dt as high as 2500 amperes per microsecond, an environment which is normally conducive to noise and reliability problems. This closed-loop check protection on the overall transistor controller, plus the switch mode power supply status operating through a central microprocessor ensures that any component failure, either in the electronics circuitry of low power level or in the output transistors, will be detected and decoded for transmission back to the X-ray generator main controller processor 26 to thereby avoid the possibility of having a shoot-thru situation which can damage devices or which can produce an uncontrolled situation in the output stage. The diagnostic status protection circuit 73 ensures that the microprocessor 26 knows, first of all, which, if any, transistor or transistor controller is not operating properly, and secondly, whether or not the power supply for that particular transistor is malfunctioning. Any error will be decoded and sent back to X-ray console centrol microcomputer to tell the operator where the trouble is so as to thereby simplify the troubleshooting effort.

Referring now to FIG. 5, there is shown an equivalent circuit for the Diagnostic Status Shoot-thru Protection 73. The voltage source +Ve provides a voltage reference to the series-connected optical transmitter 77 for transmission through conventional optical receiver 75 and fibre optics. There is also provided a resistor 78 to limit the current, and a series diode 79 which is connected directly to the collector of the output transistor $T_1$. The output of the module provides the power transistor stage status through the optical transmitter, in standard fibre optics, back to the main controller microprocessor 26. When $T_1$ is cut off, there is no current flowing through the optical transmitter resistor 78 and diode 79, and the fibre optics is in an off stage. When transistor $T_1$ is turned on, current flows from the positive rail through the optical transmitter 77, resistor 78 and diode 79 and the collector emitter of the output transistor $T_1$ to turn on the optical fibre and send a command to the central microprocessor to distinguish or acknowledge that that particular $T_1$ output transistor has been turned on.

In summary, the transistor controller is a completely, optically isolated module which is controlled by a microprocessor and which provides for turn-on and turn-off protection and normal running operation of output transistor stages operating at up to typically 1500 amps, 600 volts. It acts to control large power transistor inverters in such a way so that they can be applied to a variety of load conditions and power-factor variations, with medium to high frequency pulse-width modulation switching operation, and operates in conjunction with an integrated switch-mode power supply that is electrically isolated from the source with high common-mode noise and transients rejection in both transverse and common-mode operations.

What is claimed is:

1. A protective network for use with a power transistor of an inverter of the type operating from a DC source and having a plurality of transistors arranged in a bridge relationship with the transistors being selectably turned on and off to provide an alternating current which is rectified for application to an X-ray tube comprising:
   (a) turn-on circuit means for selectively applying a positive voltage to the base of the power transistor to cause it to conduct;
   (b) turn-off circuit means for selectively applying a negative voltage to the base of the power transistor to turn it off;
   (c) means for sensing the voltage level on the collector of the power transistor, said voltage sensing means including a diode with its cathode connected to the collector of the power transistor and its anode connected to the positive terminal of a comparator and to a predetermined positive voltage source, a reference voltage being applied to the negative terminal of said comparator; and
   (d) means for activating said turn-off circuit when said collector voltage level exceeds a predetermined threshold level.

2. An X-ray generator system for use with a DC voltage source and a high voltage transformer to supply a controlled level of high voltage to an X-ray tube comprising:
   (a) an inverter for receiving a DC voltage of a lower level and delivering an AC voltage output to the primary of the high voltage transformer, said inverter comprising a plurality of switching devices which are selectively turned on and off in a predetermined sequence by a control system;
   (b) rectifier means for receiving the output from the secondary coil of said transformer and for delivering a DC voltage of a higher level to an X-ray tube;
   (c) means for sensing the voltage on at least one of said switching devices, said sensing means including a diode with its cathode connected to said switching device and its anode connected to the positive terminal of a comparator and to a positive DC voltage source with the negative terminal of the comparator connected to a reference voltage source; and
   (d) means for turning off said switching device when said voltage reaches a predetermined threshold level.

* * * * *